(12) United States Patent
Liu et al.

(10) Patent No.: US 11,968,296 B2
(45) Date of Patent: Apr. 23, 2024

(54) UTILIZATION OF A MEMORY DEVICE FOR PER-USER ENCRYPTION

(71) Applicant: Micron Technology, Inc., Boise, ID (US)

(72) Inventors: Zhan Liu, Cupertino, CA (US); Lance W. Dover, Fair Oaks, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/196,169

(22) Filed: Mar. 9, 2021

(65) Prior Publication Data
US 2022/0294614 A1 Sep. 15, 2022

(51) Int. Cl.
*H04L 9/08* (2006.01)
*H04L 61/5007* (2022.01)
*H04L 101/622* (2022.01)

(52) U.S. Cl.
CPC .......... *H04L 9/0841* (2013.01); *H04L 9/0825* (2013.01); *H04L 9/0861* (2013.01); *H04L 61/5007* (2022.05); *H04L 2101/622* (2022.05)

(58) Field of Classification Search
CPC . H04L 9/0841; H04L 61/5007; H04L 9/0825; H04L 9/0861; H04L 2101/622
USPC ...................................................... 713/171
See application file for complete search history.

(56) References Cited

U.S. PATENT DOCUMENTS

| | | | |
|---|---|---|---|
| 10,785,199 B1* | 9/2020 | Chhabra | H04L 63/045 |
| 11,354,048 B2* | 6/2022 | Kim | G06F 21/79 |
| 2007/0076877 A1 | 4/2007 | Camp, Jr. et al. | |
| 2008/0301461 A1 | 12/2008 | Coulier et al. | |
| 2013/0227279 A1 | 8/2013 | Quinlan et al. | |
| 2014/0298012 A1 | 10/2014 | Orsini et al. | |
| 2015/0381363 A1* | 12/2015 | Teixeira | H04L 9/14 380/45 |
| 2016/0099922 A1* | 4/2016 | Dover | H04L 9/0822 713/171 |
| 2017/0171174 A1* | 6/2017 | Campagna | H04L 63/061 |
| 2020/0100108 A1* | 3/2020 | Everson | H04W 12/068 |
| 2020/0213306 A1* | 7/2020 | Thomsen | H04L 9/0637 |
| 2021/0218560 A1* | 7/2021 | Nix | H04L 9/3252 |

FOREIGN PATENT DOCUMENTS

CN 106507331 3/2017

* cited by examiner

*Primary Examiner* — Moeen Khan
(74) *Attorney, Agent, or Firm* — Greenberg Traurig

(57) ABSTRACT

Disclosed are methods for encrypting communications with a remote endpoint via a memory device. In one embodiment, a memory device is configured to receive, from the application, a request to establish a communications session with a remote computing device, establish a shared symmetric key, the shared symmetric key shared between the memory device and the remote computing device, receive a message from the application, the message including an identifier of the remote computing device and a payload, generate a ciphertext using the symmetric key and the payload, and return the ciphertext to the application.

15 Claims, 6 Drawing Sheets

UTILIZATION OF A MEMORY DEVICE FOR PER-USER ENCRYPTION

TECHNICAL FIELD

At least some embodiments disclosed herein relate to authentication in general, and more particularly, but not limited to authentication of a communication endpoint having a secure memory device in a service network.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
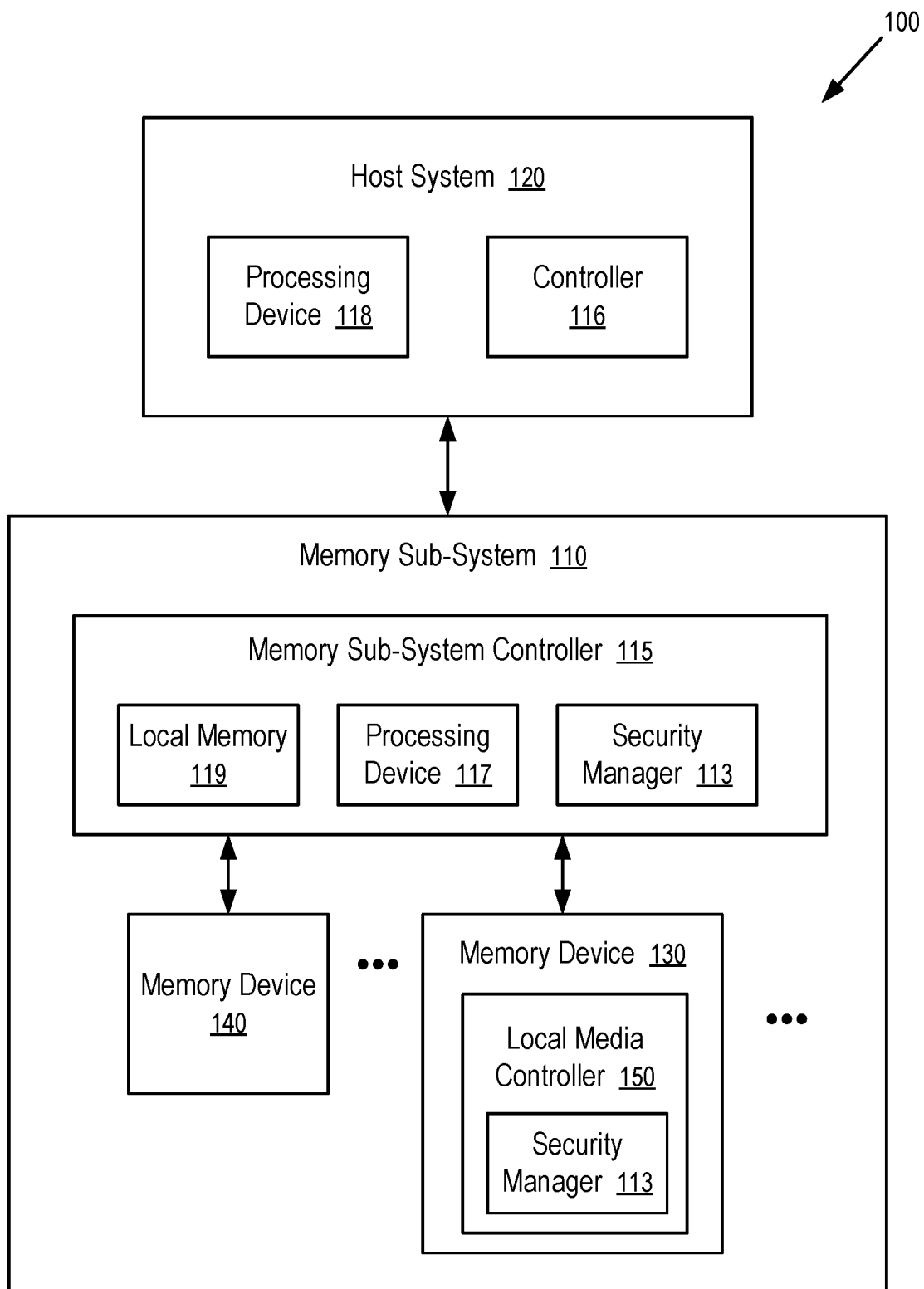
FIG. 1 illustrates an example computing system having a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130).

In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 configured to generate a certificate that can be used to authenticate that the computing system 100, as an endpoint in a computer network, has a particular combination of the memory device 130 with one or more other components. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip included in the memory sub-system 110. In other embodiments, the security manager 113 can be part of firmware of the memory sub-system 110, an operating system of the host system 120, a device driver, or an application, or any combination therein.

For example, the security manager 113 can determine a cryptographic hash value of a set of instructions to be executed during boot time of the computing system 100. The security manager 113 can check the integrity of the set of instructions by comparing the hash value computed at the boot time with a pre-calculated hash value. If the hash values agree with each other, the set of instructions can be considered to have not been tampered with and/or corrupted. Thus, the set of instructions can be executed in the computing system 100 to further implement the security operations of the security manager 113 and/or the boot operations of the computing system 100. Optionally, the verification of the hash value can be part of the authentication of the computing system 100 as an endpoint using a certificate generated through the execution of at least a portion of the set of instructions during the boot time of the computing system 100.

For example, an identifier of the memory device 130 can be generated based at least in part on the hash value of the set of instructions. Thus, when the identifier of the memory device 130 is authenticated through the verification of the certificate, the hash value of the set of instructions can be considered to have been verified as correct; and the set of instructions used to generate the certificate and to boot up the computing system 100 has not been tampered with and/or corrupted.

The execution of the set of instructions in the computing system 100 causes the computing system 100 to determine the identifies of other components of the computing system 100, such as an identifier of the processing device 118, an identifier of the controller 116, an identifier of the memory sub-system controller 115, an identifier of the memory device 140, and/or an identifier of a software program (e.g., an operating system, a device driver, an application program, etc.). The set of identifiers of the components in the computing system 100 having the memory device 130, including the identifier of the memory device 130, can be combined to generate a cryptographic key for the signing of a certificate. The certificate may include a monotonically increasing counter value that increases every time the computing system 100 is booted up and/or every time the memory device 130 performs a secure operation.

The certificate can be communicated with a remote computer over a computer network for authentication. In some embodiments, the host device can further confirm the identity of the memory device via a challenge-response protocol. In these embodiments, the host device generates and issues a challenge to the memory device (e.g., a random or pseudo-random value). The memory device signs the challenge with its private key and returns the signed value. The host device can then confirm the signature using the correspond public key of the memory device. If the signatures match, the host device can confirm the memory device's identity. When the certificate is authenticated and the memory device's identity is confirmed, it can be concluded that the integrity of the set of instructions used to generate the certificate is intact, and the computing system 100 has the memory device 130 in combination with the set of components represented by the identifiers used to generate the cryptographic key that is used to sign the certificate. Additionally, the monotonic counter value included in the certificate allows its recipient to verify that it was generated recently, and thus that it can be trusted.

Figure 2:
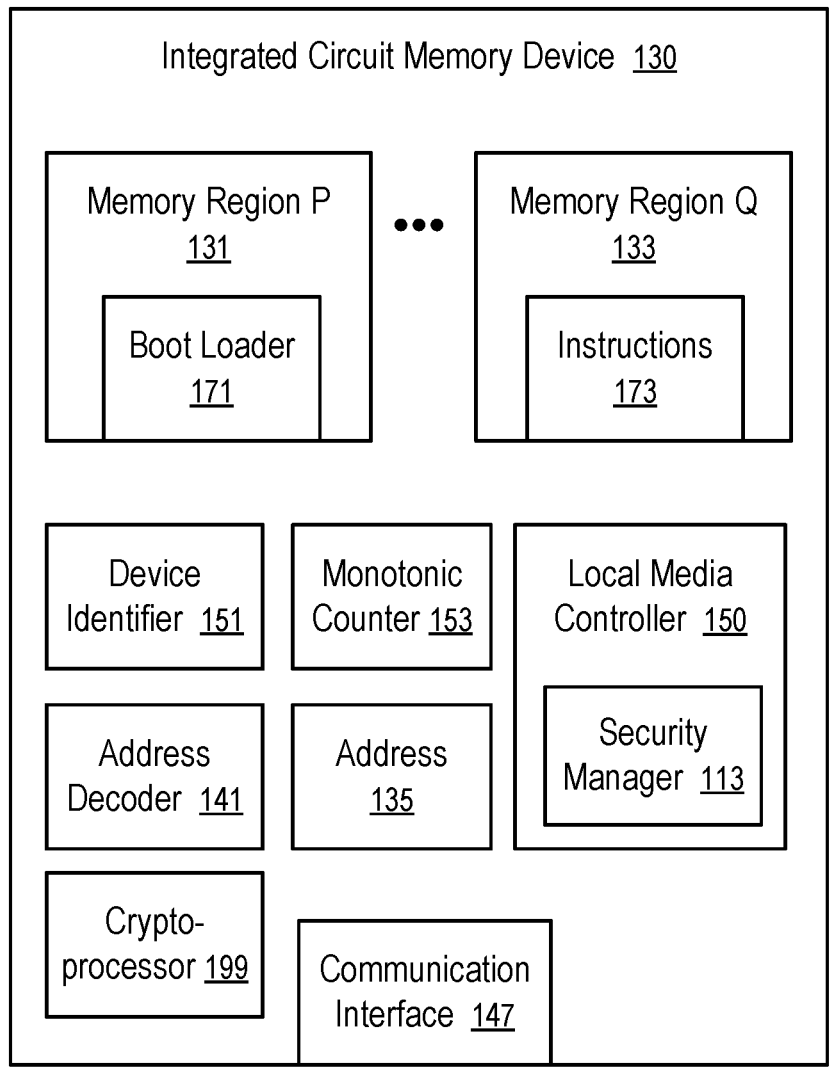
FIG. 2 illustrates an integrated circuit memory device having a security manager according to one embodiment.

FIG. 2 illustrates an integrated circuit memory device having a security manager according to one embodiment. For example, the memory devices 130 in the memory sub-system 110 of FIG. 1 can be implemented using the integrated circuit memory device 130 of FIG. 2.

The integrated circuit memory device 130 can be enclosed in a single integrated circuit package. The integrated circuit memory device 130 includes multiple memory regions 131, . . . , 133 that can be formed in one or more integrated circuit dies. A typical memory cell in a memory region 131, . . . , 133 can be programmed to store one or more bits of data.

The local media controller 150 can include at least a portion of a security manager 113 that is configured to control access to at least one of the memory regions 131, . . . , 133.

For example, the security manager 113 can control access to a memory region 131 based on a cryptographic key that is generated based on a secret of the integrated circuit memory device 130 and/or a cryptographic key representative of an owner or an authorized user of the memory device 130. When a request to write data into the memory region 131 is received in the integrated circuit memory device 130, the security manager 113 can verify whether the request can be permitted based on whether the requester is in possession of the cryptographic key. For example, the requester may digitally sign the request, or a challenge message, using the cryptographic key to indicate that requester has the permission to write data into the memory region 131.

The integrated circuit memory device 130 has a communication interface 147 to receive a command having an address 135 from the controller 115 of a memory sub-system 110. In response to the address 135 identifying a memory region 131 that requires access control, the security manager 113 performs cryptographic operations to verify that the request is from a requester having the cryptographic key authorized for the access to the memory region 131, before providing memory data retrieved from the memory region 131 using an address decoder 141. The address decoder 141 of the integrated circuit memory device 130 converts the address 135 into control signals to select a group of memory cells in the integrated circuit memory device 130; and a local media controller 150 of the integrated circuit memory device 130 performs operations to determine the memory data stored in the memory cells at the address 135.

For example, the memory region 131 can store a boot loader 171. At boot time, the security manager 113 can measure the boot loader 171 by computing a cryptographic hash value of the boot loader 171. The cryptographic hash value of the boot loader 171 can be used to generate a device identifier 151 of the integrated circuit memory device 130. The boot loader 171 (and/or an operating system or a device driver, or a security application) can include instructions to implement a portion of the security manager 113. During the boot time, the instructions can determine the configuration of the computing system 100 in which the integrated circuit memory device 130 is a component.

For example, the configuration of the computing system 100 of FIG. 1 can include the major software/firmware components of the memory sub-system 110. The software/firmware can be stored in other memory devices (e.g., 140), or in the memory device 130 in a memory region 133. For example, the instructions 173 in the memory region 133 in the integrated circuit memory device 130 can include the operating system of the computing system 100, device drivers, firmware, and/or software applications. Some of the major software/firmware components of the memory sub-system 110 can be stored outside of the memory region(s) under the access control of the security manager 113 and/or outside of the integrated circuit memory device 130. The identifiers of the software/firmware components can include component identifications, version numbers, serial numbers, and/or cryptographic hash values of the software/firmware components.

The configuration of the computing system 100 of FIG. 1 can include the major hardware components of the memory sub-system 110, such as the processing device 118 and/or the controller 116. The host system 120 can further include peripheral devices, such as a network interface card, a communication device, another memory sub-system, etc. The identifiers of the hardware components can include serial numbers, addresses, identification numbers, etc.

The configuration information of the computing system 100, including the device identifier 151 can be used to generate a cryptographic key to sign a certificate generated using at least the value from a monotonic counter 153. The security manager 113 is configured to increase the monotonic counter 153 for each use of the boot loader 171 to start the computing system 100 in which the memory device 130 is configured.

Figure 3:
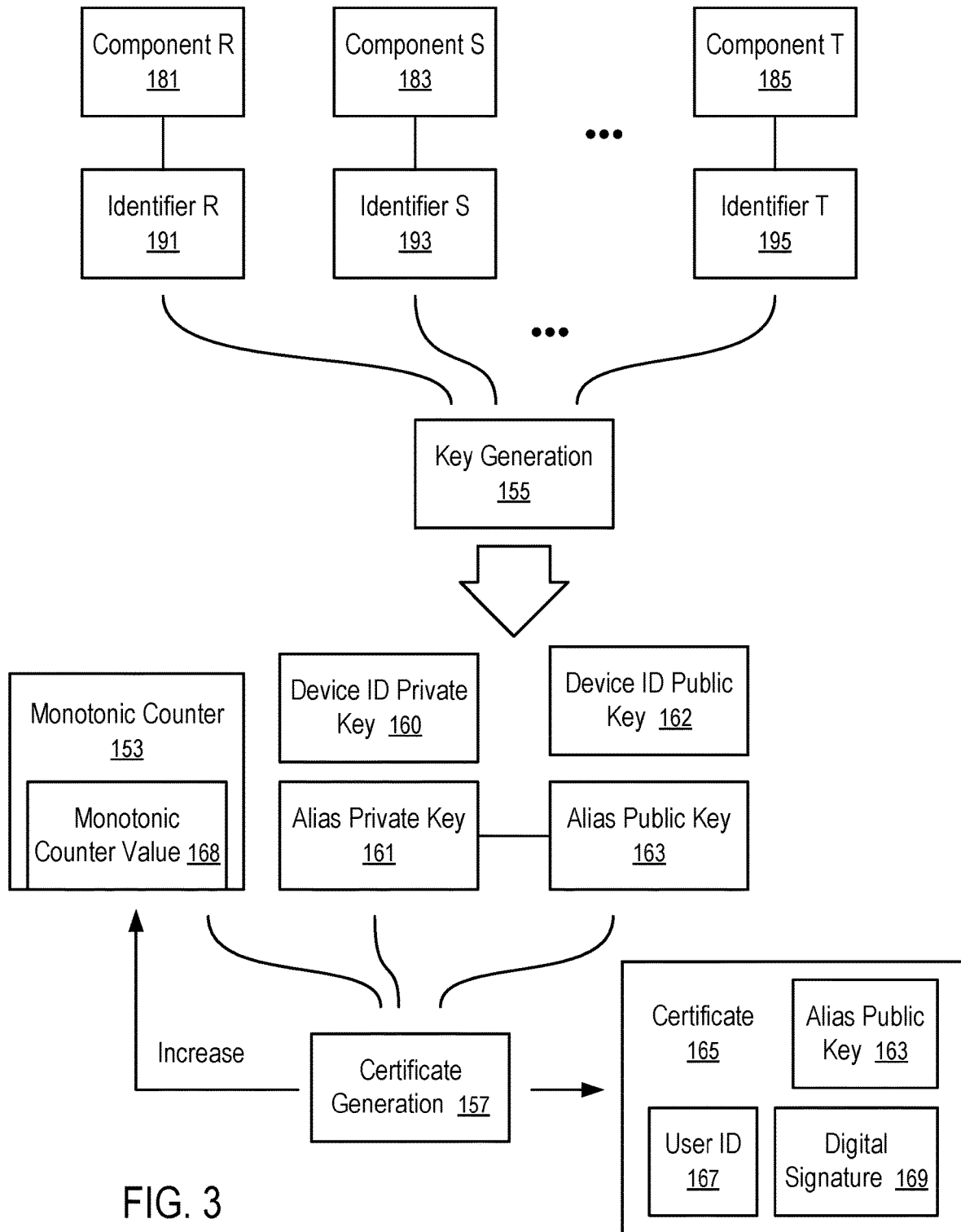
FIG. 3 illustrates the generation of a certificate for endpoint authentication according to one embodiment.

FIG. 3 illustrates the generation of a certificate for endpoint authentication according to one embodiment. For example, the security manager 113 illustrated in FIG. 1 and/or 2 can generate a certificate using the technique of FIG. 3 at boot time of a computing system 100.

In FIG. 3, a computing system 100 has a set of components 181, 183, . . . , 185. The components 181, 183, . . . , 185 can include software components and/or hardware components. The components 181 to 185 can have corresponding identifiers 191, 193, . . . , 195. For example, a component S 183 can be a software component having an identifier S 193; and a component T 185 can be a hardware component having a separate identifier T 195.

An identifier of a component identifies at least some unique aspects of the component. In some instances, an identifier can uniquely identify a component among similar components having the same or similar functions. For example, an identifier of a software component can include or be based on a cryptographic hash value of the software component and/or a serial number of the software component. For example, an identifier of a hardware component can be based on a type, a description, a serial number, and/or an address of the hardware component.

An operation of key generation 155 is performed to obtain a first pair of a device ID private key 160 and a device ID public key 162 and a second pair of an alias private key 161 and an alias public key 163. In one embodiment, a physical unclonable function (PUF) may be used to generate a symmetric key on the device. This PUF may comprise an SRAM PUF, Delay PUF, or any other PUF technology implemented on the device. A PUF generally generates a digital fingerprint given a set of physical characteristics of a semiconductor device. Thus, the digital fingerprint is uniquely associated with each circuit used to generate the PUF. When implemented in a memory device, the PUF generates a unique identifier for the memory device based on the presence of the circuit in the memory device. Using this symmetric key, the device can generate a symmetric key using a symmetric key algorithm. In one embodiment, a symmetric key algorithm takes the digital fingerprint as an input and outputs the symmetric key. Since the PUF is tied to the circuitry generating the value, the PUF can be regenerated at any moment and need not be stored in volatile memory. It thus follows that the symmetric key can be regenerated consistently at any time and is not required to be stored.

The symmetric key can then be used to generate an asymmetric key pair. Similar to symmetric key generation, an asymmetric key is generated using a large random number as an input. In the illustrated embodiment, the symmetric key is used as this input and thus is used to generate the asymmetric key pairs. Since the digital fingerprint and symmetric key can be generated consistently and repeatedly at will, it thus follows that the asymmetric key pair can be generated in the same manner. Using asymmetric cryptography, ciphertext generated using the alias private key 161 can be decrypted using the alias public key 163; and ciphertext generated using the alias public key 163 can be decrypted using the alias private key 161. Since it is very difficult to determine the alias private key 161 from the alias public key 163, revealing the alias public key 163 would not compromise the secrecy of the alias private key 161.

In some embodiments, the memory device 130 may additionally include program logic and/or hardware for performing other cryptographic operations. In one embodiment, this program logic and/or hardware may be implemented as a crypto co-processor 199 in the memory device 130. In some embodiments, crypto co-processor 199 may be implemented in a memory sub-system 110 alternatively, or in addition to, implemented in the memory device 130. In one embodiment, these operations include the generation of a symmetric key as described above. Alternatively, or in conjunction with the foregoing, the memory device 130 may additionally include program logic and/or circuitry to perform a Diffie-Hellman (DH) key exchange (e.g., an Elliptic Curve DH, ECDH exchange) with another device. In one embodiment, the other device may comprise host system 120. In another embodiment, the other device may comprise server 201. In some embodiments, the memory device 130 may exchange keys with both devices. In some embodiments, the memory device 130 and/or sub-system 110 includes circuity (e.g., network transceiver) for communicating with a remote computing device. Alternatively, the memory device 130 and/or sub-system 110 may utilize an external network interface via, for example, an intermediary device such as host system 120

In one embodiment, the ECDH key exchange may use key pair 160, 162 or key pair 161, 163. A remote device (e.g., 120 or 201) may include its own public-private key pairs. In some embodiments, one or both devices may generate new public/private key pairs (referred to as public_key and private_key) to use in an ECDH exchange. Derivation of these keys based on a PUF is described above and not repeated herein. The server or host system may utilize any public/private key-pair as desired.

In an ECDH key exchange, both devices generate random key-pairs using the private key of the key-pair and an ECC elliptic curve with generator point G. Specifically, [public_random, private_random]=private_key*G. The devices can then exchange public_random keys over an insecure network (and, for example, via an intermediary device such as host system 120). Each device independently generates a shared key based on the public_random key and the device's private_key: shared_key= public_random*private_key. In some embodiments, this shared key may be used as the shared key or as an input into another cryptographic primitive (e.g., hash function) to generate a derived key. In this manner, the memory subsystem 110 and a remote endpoint can share secret key without exposing secret data to intermediary devices, such as a host system 120.

An operation of certificate generation 157 is performed to generate a certificate 165 that contains a digital signature 169 signed using the device ID private key 160. The certificate 165 contains data to be signed, including the alias public key 163 and the current monotonic counter value 168. A side-effect of the certificate generation 157 is increasing the value 168 of the monotonic counter 153.

Optionally, the certificate 165 can include a user ID 167, such as a name, an email address, a registered user name, or another identifier of an owner or authorized user of the computing system 100 in which the certificate 165 is created.

Optionally, the certificate 165 can include some of the identifiers 191 to 195 and/or the value of the monotonic counter 153.

Optionally, some of the information provided via the certificate can be in an encrypted form. For example, the information can be encrypted using a public key of a server that is authorized to access the encrypted information, such as a server that is configured to authenticate the digital signature 169.

The security manager 113 is configured to generate a certificate 165 during each instance of booting up the computing system 100 using the boot loader 171 secured in the memory device 130. A certificate 165 generated based on a higher value of the monotonic counter 153 invalidates the certificates generated user lower values of the monotonic counter 153. The remote host will refuse any certificate with lower monotonic counter value than the one used for the last successful connection.

Preferably, after the certificate 165 is generated, the device ID private key 160 is purged from the computing system 100 and the memory device 130. A set of instructions protected by the security manager 113 can be executed to use the certificate 165 generated at the boot time to authenticate the computing system 100 as an endpoint in a computer network. A remote server having the device ID public key 162 can verify that digital signature 169 and the configuration of the computing system 100 as identified by the identifiers 191 to 195 used in the key generation 155.

Figure 4:
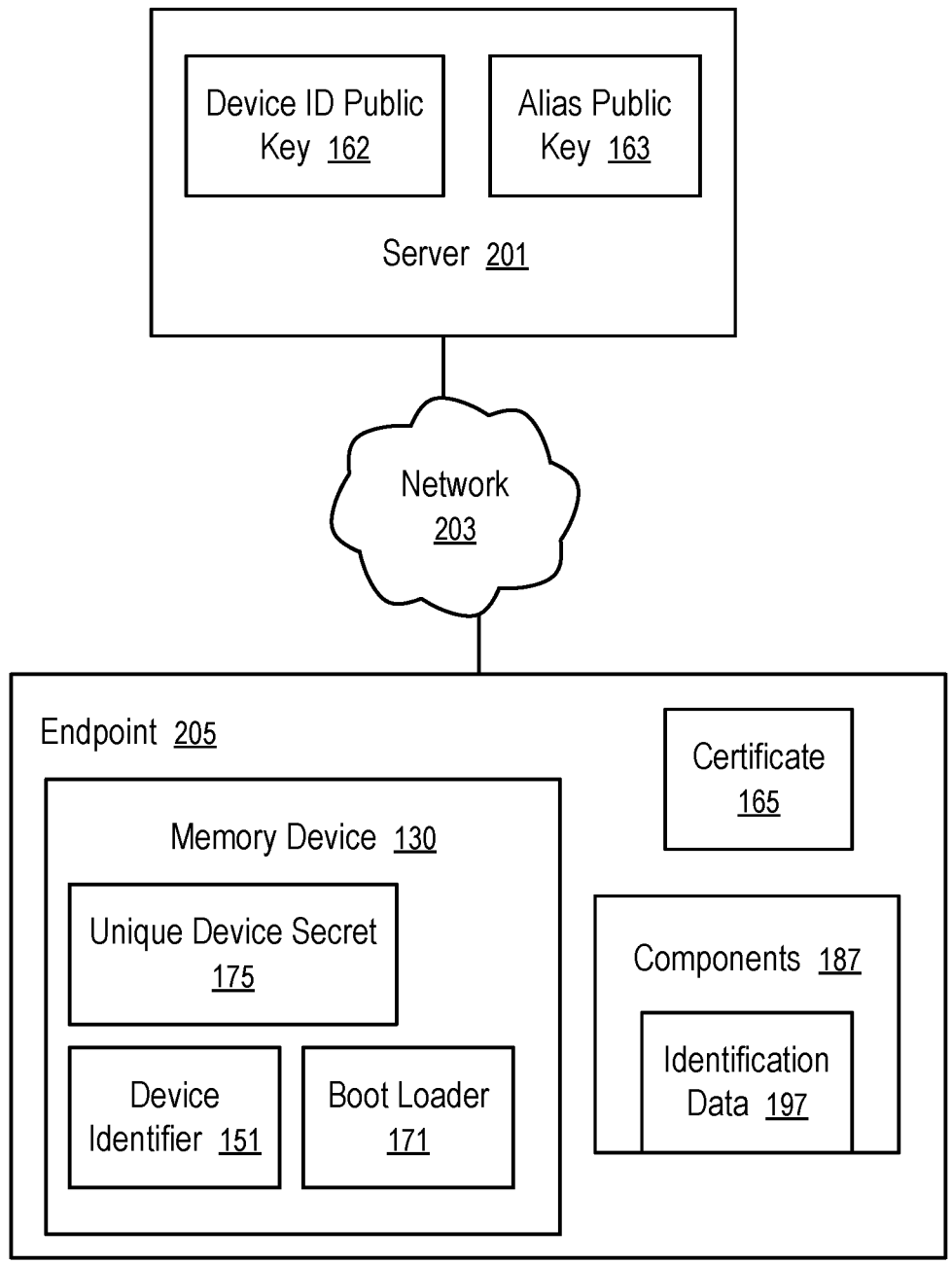
FIG. 4 illustrates the use of a certificate for endpoint authentication according to one embodiment.

FIG. 4 illustrates the use of a certificate for endpoint authentication according to one embodiment. For example, an endpoint 205 in FIG. 4 can be a computing system 100 of FIG. 1 having a security manager 113 configured in the integrated circuit memory device 130 of FIG. 2. The authentication can be performed using a certificate 165 generated using the technique of FIG. 3.

In FIG. 4, the endpoint 205 includes a memory device 130 that has a unique device secret 175. A device identifier 151 of the memory device 130 can be generated using a unique device secret 175 and a cryptographic measure of the boot loader 171. For example, the cryptographic measure of the boot loader 171 can be obtained by reading the boot loader 171 prior to its execution and applying a cryptographic hash function to the boot loader 171 to obtain a cryptographic hash value of the boot loader 171 that is to be executed.

The endpoint 205 has additional components 187 that have identification data 197. The combination of the device identifier 151 and the identification data 197 can be used to generate a certificate 165 in a way as illustrated in FIG. 3.

A server 201 connected to the endpoint 205 via a computer network 203 is provisioned to contain the device ID public key 162 corresponding to the device ID private key 160 used to sign the certificate 165. The server 201 can determine whether the certificate 165 is valid by decrypting the digital signature 169 using the device ID public key 162.

For example, when the memory device 130 is initially used in the endpoint 205 to boot up the endpoint 205, the endpoint 205 can register its identity with the server 201 by providing the device ID public key 162. The registration operation can include the storing of the device ID public key 162 to indicate that an endpoint 205, having a certificate verifiable via the device ID public key 162, is an authorized user. The device ID public key 162 can be associated with an identification of an owner and/or an authorized user of the endpoint 205.

The certificate 165 includes the value 168 of the monotonic counter 153 at the time of booting up the endpoint 205.

Optionally, the certificate 165 can include some of the identifiers 191 to 195 used to generate the alias private key 161, the alias public key 163, the device ID private key 160, and the device ID public key 162.

In some embodiments, the server 201 has a copy of the unique device secret 175. For example, the memory device 130 can be registered in a manufacturing facility of memory device 130 such that the device identifier 151 can be regenerated independently in a secure server (e.g., 201). When the server 201 receives the additional identifiers (e.g., 193 to 195, such as the identification data 197) from the endpoint 205, the secure server (e.g., 201) can independently compute the public key 163 for the authentication of the digital signature 169. Optionally, the certificate 165 can include the additional identifiers (e.g., 193 to 195, such as the identification data 197). Thus, when some of the components 187 have been replaced, the server 201 can determine whether to accept the change to the endpoint 205 or to require further verification that the endpoint 205 is legitimated and/or associated with a known owner or an authorized user.

For example, a set of instructions secured via the memory device 130 can be executed in the endpoint 205 to communicate the certificate 165 from the endpoint 205 to the server 201 for authentication. The certificate 165 of the endpoint 205 is generated at the time of booting up the endpoint 205 to represent the configuration of the endpoint 205 via the set of identifiers 191 to 195. After verifying that the certificate 165 is generated using the device ID private key 160 that represents the identifiers 191 to 195, the server 201 can determine whether the endpoint 205 having the configuration is permitted to operate and/or receiver services. In some instances, the server 201 can allow the endpoint 205 to replace certain components and/or have a replacement frequency below a threshold to pass authentication. Based on the response, the endpoint 205 can prompt the user to register, to demonstrate ownership or authorization to use, or to shut down.

Optionally, the server 201 can track the highest value of the monotonic counter 153 of the endpoint 205 as seen in the certificates from the endpoint 205 and/or the memory device 130. A certificate generated based on a counter value equal to or lower than the latest counter value used in a successful connection of one endpoint 205 to the server 201 can be described as obsolete. Endpoints 205 presenting an obsolete certificate will not be granted access to servers 201.

In some embodiments, the server 201 has a copy of the alias public key 163. When establishing a connection with the endpoint 205, and after verifying the certificate 165 has a valid digital signature 169 and a not-obsolete monotonic counter value 168, the server 201 may verify the alias public key 163 portion of the certificate. If the alias public key 163 stored in the server 201 and the alias public key 163 included in the certificate 165 do not match, then a connection with the endpoint 205 may not be allowed. This check can be used to prevent attacks where the malicious actor is able to steal the alias private key 161 from a valid device and use it on a device with a compromised identifier (e.g., one of device identifiers 151, 191, 193, . . . , 195). If the keys match, then the alias private key 161 available at runtime on the endpoint 205 may be used to sign content that may be verified by the server 201.

For example, as part of a connection establishment procedure, the server 201 may issue a challenge to the endpoint 205, which signs the response with the alias private key 161 and sends it back to the server 201. The server 201 may then use its copy of the alias public key 163 and verify that the challenge was signed by a valid endpoint 205.

Figure 5:
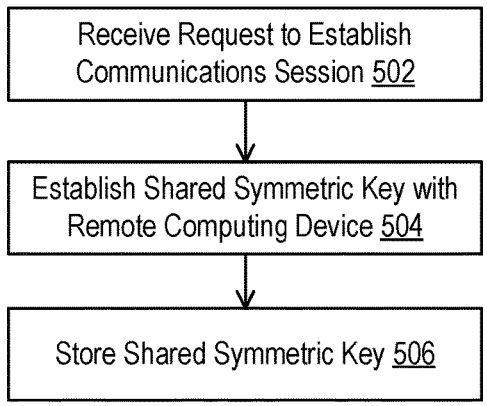
FIG. 5 illustrates a flow diagram of a method for generating a symmetric key according to some embodiments of the disclosure.

FIG. 5 illustrates a flow diagram of a method for generating a symmetric key according to some embodiments of the disclosure. In one embodiment, the methods described in connection with FIG. 5 may be performed by a memory device In block 502, the method receives a request to establish a communications session. In one embodiment, the request is received from an application running on a host system and identifies a remote computing device, such as a server 201, to connect to. In some embodiments, the remote computing device is identified with an identifier (e.g., a uniform resource locator or Internet Protocol address).

In the illustrated embodiment, a host system 120 may issue commands to the memory device 130 via a bus and interface. In one embodiment, the device supports a command instructing the memory device 130 to communicate with a remote device. In one embodiment, the memory device 130 is equipped with a network interface to communicate with remote devices. In another embodiment, the memory device 130 includes firmware or software to issue network requests via an external network interface.

In one embodiment, the request includes an identifier of the remote computing device. In one embodiment, this identifier may comprise a network address of the remote computing device. Examples of a network address include an Internet Protocol (IP) address, Media Access Control (MAC) address, Uniform Resource Locator (URL), or Uniform Resource Identifier (URI). Other types of network addresses may also be used. In some embodiments, the identifier may comprise an identifier of an internal component of a computer system. In this embodiment, the component comprises a component capable of generating a symmetric key (e.g., a peripheral device including a cryptographic processor). In this embodiment, the methods described herein may be used to secure communications with a computing device or system as well as with external devices. For example, the method may be used to encrypt communications between a computing device and a printer.

In some embodiments, the request may also include a storage location. In this embodiment, the request is requesting data from a remote computing device and also specifying where to store the returned data. For example, the request may request blocks of data from a remote computing device and specify where to start writing such data. In one embodiment, this address may comprise a logical block address (LBA) of a NAND Flash array.

In another embodiment, the request may specify a code segment to execute the returned data. In this embodiment, since the memory device may include non-volatile storage, the request may indicate a portion of executable code to execute on the data. In this embodiment, the memory device can perform in-memory processing on remote data without the application processing the data. For example, the application may issue a request including the remote identifier (e.g., URL) and a program address (e.g., 0x0AF0BC3) of the first instruction of a processing routine to execute upon receiving responsive data. In this manner, the memory device can request the data (as will be discussed) and then begin processing the data starting at the address. In some embodiments, the memory device includes a dynamic random access memory (DRAM) to load the program code and execute the program code on the returned data. In one embodiment, the method may return the processed data (unencrypted) to the application. In another embodiment, combined with the foregoing, the method may alternatively write the data to its storage array and return the location of the data to the application.

Thus, in block 502, the host application initiates a remote data session not with a remote computing device directly but via the memory device 130.

In block 504, the method establishes a shared symmetric key with a remote computing device.

In the illustrated embodiment, the shared symmetric key will ultimately be shared between the memory device and the remote computing device. In one embodiment, the method establishes the shared symmetric key via an ECDH key exchange.

In one embodiment, the ECDH key exchange may use a static key pair such as a shared symmetric key (e.g., a symmetric key generated based on a PUF). A remote device (e.g., 120 or 201) may include its own public-private key pairs. In some embodiments, one or both devices may generate new public/private key pairs (referred to as public_key and private_key) to use in an ECDH exchange. Derivation of these keys based on a PUF is described above and not repeated herein. The server or host system may utilize any public/private key-pair as desired.

In an ECDH key exchange, both devices generate random key-pairs using the private key of the key-pair, and an ECC elliptic curve with generator point G. Specifically, [public_random, private_random]=private_key*G. The devices can then exchange public_random keys over an insecure network (and, for example, via an intermediary device such as host system 120). Each device independently generates a shared key based on the public_random key and the device's private_key: shared_key=public_random*private_key. In some embodiments, this shared key may be used as the shared key or may an input into another cryptographic primitive (e.g., hash function) to generate an alias or derived key. In this manner, the memory sub-system 110 and a remote endpoint can share secret key without exposing secret data to intermediary devices, such as a host system 120.

Thus, in the illustrated embodiment, the memory device can generate a shared, symmetric key utilized for encryption and signature operations. Notably, the memory device can establish this shared key without allowing access to the shared key to the application or host processor.

Alternatively, in some embodiments, the key exchange may utilize a volatile or alias key derived from a static symmetric key. In these embodiments, the method creates a derived volatile key from the shared (e.g., nonvolatile or regeneratable) symmetric key. In such an implementation, the static symmetric key is used infrequently, thereby lowering its ability to be attacked. By contrast, the derived volatile key is the actual key used in practice and it can be changed often. For example, the method may generate the derived volatile key at each power on or on-demand by the host processor. By using a derived key, the method can reduce the effectiveness of side-channel attacks to discover the key. Further, when the key changes more frequently than the time it takes for the attack to be successful then such attacks will fail.

In some embodiments, the memory device may support an additional command that allows the host application to request the shared key. In this embodiment, the host application signs the command with its own private key and the memory device can verify the command with the corresponding public key stored in the memory device. Thus, the memory device may be configured to only provide the shared key to an authorized host application.

In block 506, the method stores the shared key.

In one embodiment, the method may store the shared key in a secure storage element such as a trusted execution environment (TEE) or similar secure processing environment. As discussed, in some embodiments, the method does not allow access to the shared key to other devices. However, in alternative embodiments, the method may support providing the shared key to authorized devices upon verifying the integrity of a request for such a shared key.

Figure 6:
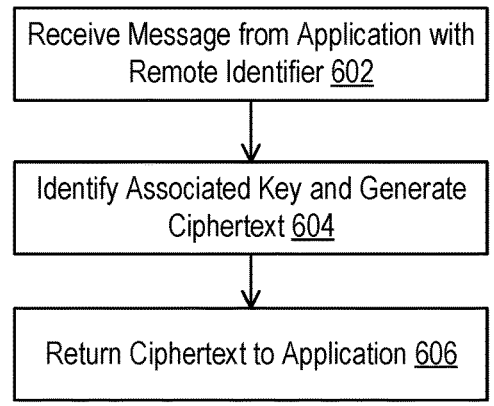
FIG. 6 illustrates a flow diagram of a method for encrypting a message according to some embodiments of the disclosure.

FIG. 6 illustrates a flow diagram of a method for encrypting a message according to some embodiments of the disclosure.

In block 602, the method receives a message from an application, the message including an identifier of the remote computing. In some embodiments, the message additionally includes a payload.

In the illustrated embodiment, the identifier may comprise an IP address, MAC address, URL, URI, or similar identifier as discussed. In one embodiment, the payload may comprise any data needed to fulfill the request. For example, in one embodiment, the identifier may comprise a domain and protocol (e.g., "https://example.com"). The payload may comprise a Hypertext Transfer Protocol (HTTP) method (e.g., "GET") and a path (e.g., "/secureResource.txt"). Thus, in some embodiments, the memory device will process the payload and identifier to generate a network request (e.g., "GET https://example.com/secureResource.txt"). Certainly, other parameters may be included in the payload (e.g., HTTP header fields, POST body parameters). Further, in some embodiments, the method may generate its own fields for inclusion in the network request.

In block 604, the method identifies an associated shared key and generates a ciphertext.

In one embodiment, the method maintains a secure table mapping remote computing device identifiers to shared keys. In one embodiment, this table is stored in a TEE or similar secure environment that is inaccessible by external devices. In this block, the method determines if a shared key has been generated for the remote endpoint.

In one embodiment, if no shared key is found, the method may return an error to the application. However, in other embodiments, the method may execute the method of FIG. 5 to generate a shared key "on the fly" in response to the message, thus ensuring that all requests to valid endpoints are processed when received, despite a lack of pre-generating the shared key.

After identifying the shared key, the method encrypts the message payload using the shared key. In one embodiment, a symmetric encryption algorithm may be used to generate the encrypted ciphertext. The specific symmetric encryption algorithm used is not limiting.

In block 606, the method returns the ciphertext to the application.

In one embodiment, the method returns the encrypted ciphertext to the application for forwarding to the remote computing device. In another embodiment, the memory device may not return the ciphertext and may instead transmit the ciphertext message to the remote computing device. In some embodiments, the memory device performs this transmission via its own network interface. In other embodiments, the memory device may utilize an external network interface.

Figure 7:
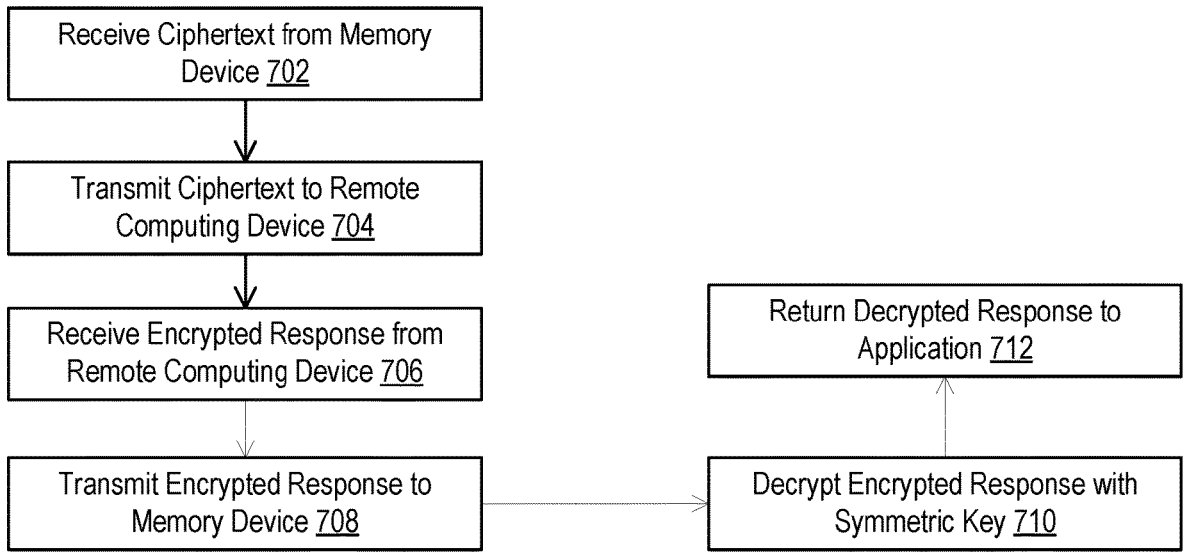
FIG. 7 illustrates a flow diagram of a method for decrypting a responsive message according to some embodiments of the disclosure.

FIG. 7 illustrates a flow diagram of a method for decrypting a responsive message according to some embodiments of the disclosure.

In block 702, the method receives a ciphertext from a memory device.

In one embodiment, after the memory device encrypts the message, the memory device returns a ciphertext that comprises the encrypted message. In one embodiment, the application receives this ciphertext from a memory device. In one embodiment, the ciphertext is received a response to the command issued in and received by the memory device in step 602 of FIG. 6.

In some embodiments, step 702 may be optional and steps 704, 706, and 708 may be performed entirely in a memory device. In this embodiment, the memory device is equipped with a network interface or otherwise has access to an external interface and can thus transmit data to a remote computing device independent of the host system and application.

In block 704, the method transmits the ciphertext to a remote computing device.

In one embodiment, the method uses the identifier of the remote computing device and any necessary parameters to generate a network endpoint. The method then includes the ciphertext as the payload of the message and transmits the payload to the network endpoint.

For example, in one embodiment, the payload may comprise a user identifier (e.g., "username") and password (e.g., "password"). The memory device encrypts the payload to generate a cipher text (e.g., "f6b71f1ec062312698ccc9dd862f9408" and "1c7ac320d4 fe7009d759f7d74966f538"). The identifier may comprise an HTTP action ("POST http://example.com/login"). Thus, the method may set the POST body of the HTTP action to the ciphertext and generate a full HTTP request message:

```
POST /login HTTP/1.1
Host: example.com
Content-Type: application/x-www-form-urlencoded
Content-Length: 83
username=f6b71f1ec062312698ccc9dd862f9408&
    password=1c7ac320d4fe7009d759f7d74966f538
```

As discussed, some of the above header fields may be included in the message received in step 602 (e.g., "POST", "/login", "example.com", the payload keys "username" and "password"). Some fields may be automatically generated by the memory device (e.g., "Content-Type") or may be specified by the application. Finally, some fields may be necessarily generated by the memory device including the ciphertext, the final payload and the length of the payload. Note that in this example, an insecure channel is used thus allowing, as an example, an encrypted password to be transmitted over such a channel without requiring the use of a secure transport layer. Certainly, a secure layer may be used and may be advisable.

In block 706, the method receives an encrypted response from a remote computing device.

In one embodiment, the encrypted response may be transmitted according to the method used to transmit the request. For example, an HTTP response may be returned in response to an HTTP request. In one embodiment, the encrypted response comprises the response body of the response. That is, the encrypted response may be comprise a payload of the response (excluding header data). For example, the response body may comprise a Javascript Object Notation (JSON) object of ({"status":"success"}) which may be encrypted as the value "39cc8455ca2a21188fdc6e633c886b70a7478a597eb8c 05a6588c28a0a5ecaf8."

In block 708, the method transmits an encrypted response to a memory device.

In some embodiments, the encrypted response comprises a ciphertext generated by the remote computing device. In one embodiment, the method transmits a message to the memory device that includes the cipher text. In some embodiments, this message may further include an identity of the remote computing device.

In some embodiments, block 708 may be optional. In these embodiments, the memory device receives the encrypted response directly from the remote computing device. In the illustrated embodiment, however, the application is responsible for receiving responses from the remote computing device. In this scenario, the method extracts the encrypted response body and transmits the encrypted response ciphertext to the memory device. In some embodiments, the application will include a remote computing device identifier along with the encrypted response to enable the memory device to identify the appropriate shared symmetric key. In some embodiments, if the application obtains the symmetric key (as described), the following block 710 may be executed by the application and block 712 may be omitted. In the embodiments where the application issues a message to the memory device to decrypt a response, the application may be required to sign the message with a private key corresponding to a public key stored on the memory device. This ensures that only an authorized application can request decryption of a message.

In the illustrated embodiment, blocks 702, 704, 706, and 708 may be performed by a host system 120. Further, blocks 710 and 712 may be performed by a memory sub-system 110 or memory device 130.

In block 710, the method decrypts the encrypted response with the shared symmetric key.

In one embodiment, the method identifies the shared symmetric key based on an identifier included in the message including the encrypted response. Then, the method decrypts the encrypted response using the shared symmetric key.

In one embodiment, the memory device uses the identifier to search a table of shared symmetric keys. Upon identifying a shared symmetric key associated with a remote computing device (identified by the identifier), the method decrypts the encrypted response using the identified key, thus generating the cleartext response. In some embodiments, the memory device will validate the message that includes the encrypted message by validating a digital signature signed by the application using a public key stored on the memory device, thus ensuring only authorized devices can request decryption and receive the cleartext response.

In block 712, the method returns the decrypted response to the application. In the illustrated embodiment, the method returns the decrypted ciphertext to the application in response to the message that included the encrypted response. As discussed, in some embodiments, block 710 may be performed by a host processor and thus block 712 may be optional.

Figure 8:
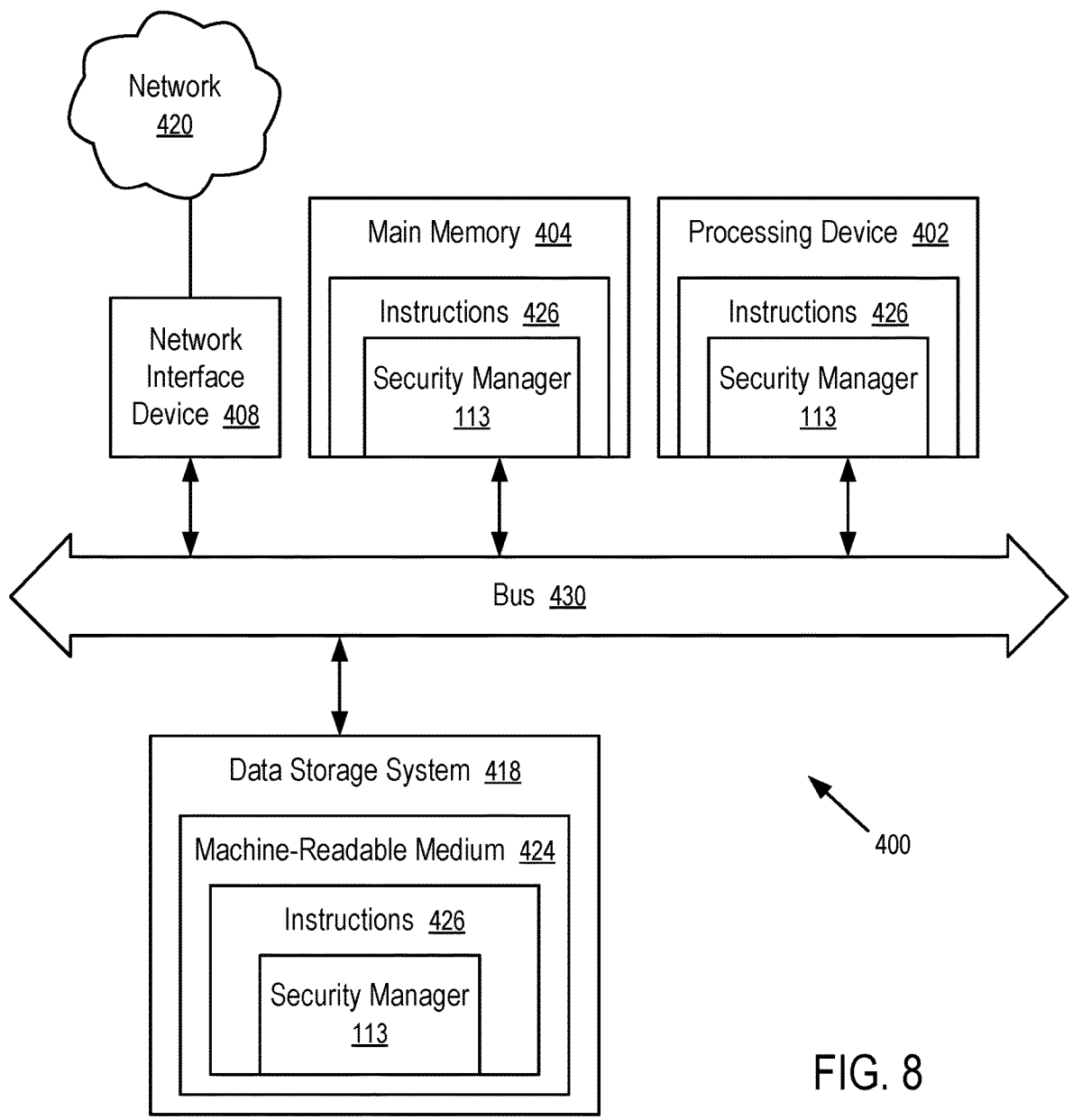
FIG. 8 is a block diagram of an example computer system in which embodiments of the present disclosure can operate.

FIG. 8 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a security manager 113 (e.g., to execute instructions to perform operations corresponding to the security manager 113 described with reference to FIGS. 1-8). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to a security manager 113 (e.g., the security manager 113 described with reference to the preceding Figures). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, via a memory controller of a memory device of a computing device from an application executing on a processor of the computing device wherein the processor and the memory device are communicatively coupled via a memory bus, a command to establish a communications session with a remote computing device communicatively connected to the computing device over a network, the command comprising a command to access a network supported by firmware of the memory controller;
    generating, by the memory controller, a shared symmetric key, the shared symmetric key shared between the memory device and the remote computing device;
    storing, by the memory controller, the shared symmetric key in a secure area of the memory device inaccessible by the processor of the computing device;
    receiving, at the memory controller, a second command from the application, the second command including a network identifier of the remote computing device and a payload to transmit to the remote computing device;
    retrieving, by the memory controller, the shared symmetric key from the secure area based on the network identifier;
    generating, by the memory controller, a ciphertext by encrypting the payload using the shared symmetric key;
    returning, by the memory controller, the ciphertext to the processor, causing the processor to transmit the ciphertext to the remote computing device;
    receiving, by the memory controller, a third command from the processor including an encrypted response, the encrypted response generated by the remote computing device responsive to the ciphertext;
    retrieving, by the memory controller, the shared symmetric key from the secure area based on the network identifier;
    decrypting, by the memory controller, the encrypted response using the shared symmetric key to obtain a decrypted response; and
    returning, by the memory controller, the decrypted response as a response to the third command.

2. The method of claim 1, wherein receiving the command to establish the communications session comprises receiving the network identifier of the remote computing device.

3. The method of claim 2, wherein receiving the network identifier of the remote computing device comprises receiving a network address of the remote computing device.

4. The method of claim 3, wherein receiving a network address of the remote computing device comprises receiving an address selected from the group consisting of an Internet Protocol (IP) address, Media Access Control (MAC) address, Uniform Resource Locator (URL), or Uniform Resource Identifier (URI).

5. The method of claim 1, wherein establishing the shared symmetric key comprises establishing the shared symmetric key via a Diffie-Hellman key exchange protocol.

6. The method of claim 1, further comprising transmitting, by the memory device, the shared symmetric key to the application in response to a signed key request message.

7. The method of claim 1, wherein establishing the shared symmetric key comprises communicating, by the memory device, with the remote computing device via the application.

8. The method of claim 1, wherein establishing the shared symmetric key comprises generating a volatile, derived key from a static symmetric key.

9. A device comprising:
    a host processor configured to execute an application; and
    a memory device coupled to the host processor over a local memory bus, the memory device comprising a storage area configured to store data and a memory controller configured to:
        receive, from the application, a command to establish a communications session with a remote computing device communicatively connected to the device over a network, the command comprising a command to access a network supported by firmware of the memory controller,
        generate a shared symmetric key, the shared symmetric key shared between the memory device and the remote computing device,
        store the shared symmetric key in a secure area of the storage area inaccessible by the host processor,
        receive a second command from the application, the second command including a network identifier of the remote computing device and a payload to transmit to the remote computing device,
        retrieve the shared symmetric key from the secure area based on the network identifier,
        generate a ciphertext by encrypting the payload using the shared symmetric key and the payload,
        return the ciphertext to the processor, causing the processor to transmit the ciphertext to the remote computing device,
        receive a third command from the processor including an encrypted response, the encrypted response generated by the remote computing device responsive to the ciphertext;
        retrieve the shared symmetric key from the secure area based on the network identifier;
        decrypt the encrypted response using the shared symmetric key to obtain a decrypted response; and
        return the decrypted response as a response to the third command.

10. The device of claim 9, wherein receiving the command to establish the communications session comprises receiving the network identifier of the remote computing device.

11. The device of claim 9, wherein establishing the shared symmetric key comprises establishing the shared symmetric key via a Diffie-Hellman (DH) key exchange protocol.

12. The device of claim 9, the memory controller further configured to transmit the shared symmetric key to the application in response to a signed key request message.

13. The device of claim 9, wherein establishing the shared symmetric key comprises communicating, by the memory device, with the remote computing device via the application.

14. The device of claim 9, wherein establishing the shared symmetric key comprises generating a volatile, derived key from a static symmetric key.

15. A non-transitory computer-readable storage medium for tangibly storing computer program instructions capable of being executed by a computer processor, the computer program instructions defining steps of:
    receiving, via a memory controller of a memory device communicatively coupled to the computer processor over a local memory bus, a command to establish a communications session with a remote computing device from an application executed by the computer processor communicatively connected to the computer processor over a network, the command comprising a command to access a network supported by firmware of the memory controller;

generating, by the memory controller, a shared symmetric key, the shared symmetric key shared with the remote computing device, the shared symmetric key comprising a volatile, derived key generated from a static symmetric key;

storing, by the memory controller, the shared symmetric key in a secure area of the memory device inaccessible by the processor of the computing device;

receiving, by the memory controller, a second command from the application, the second command including a network identifier of the remote computing device and a payload to transmit to the remote computing device;

retrieving, by the memory controller, the shared symmetric key from the secure area based on the network identifier;

generating, by the memory controller, a ciphertext by encrypting the payload using the shared symmetric key and the payload;

returning, by the memory controller, the ciphertext to the processor, causing the processor to transmit the ciphertext to the remote computing device;

receiving, by the memory controller, a third command from the processor including an encrypted response, the encrypted response generated by the remote computing device responsive to the ciphertext;

retrieving, by the memory controller, the shared symmetric key from the secure area based on the network identifier;

decrypting, by the memory controller, the encrypted response using the shared symmetric key to obtain a decrypted response; and returning, by the memory controller, the decrypted response as a response to the third command.

* * * * *